United States Patent [19]

Mason et al.

[11] 4,051,696
[45] Oct. 4, 1977

[54] SPLINE MECHANISM FOR DRILL TOOLS

[75] Inventors: Leonard Mason; Clifford Anderson, both of Edmonton, Canada

[73] Assignee: Lee - Mason Tools Ltd, South Edmonton, Canada

[21] Appl. No.: 613,005

[22] Filed: Sept. 12, 1975

[30] Foreign Application Priority Data

Apr. 1, 1975 Canada ................................. 223511

[51] Int. Cl.² .............................................. F16D 3/06
[52] U.S. Cl. ........................................ 64/23; 64/9 R; 64/27 NM
[58] Field of Search ..................... 64/23, 9, 14, 27 NM

[56] References Cited

U.S. PATENT DOCUMENTS

| 2,334,309 | 11/1943 | Brown ................................... 64/23 |
| 2,446,942 | 8/1948 | McFarland ............................. 64/14 |
| 2,987,129 | 6/1961 | Webb ..................................... 64/23 |
| 3,323,327 | 6/1967 | Lenthers et al. ......................... 64/23 |
| 3,383,126 | 5/1968 | Salvatori et al. ........................ 64/23 |
| 3,933,012 | 1/1976 | Ketchum ................................ 64/23 |

Primary Examiner—Samuel Scott
Assistant Examiner—Randall Heald

[57] ABSTRACT

The spline mandrel and barrel are formed with longitudinally extending, circumferentially spaced grooves in their outer and inner surfaces respectively. Composite splines are inserted into the grooves to key the mandrel and barrel together. Each spline comprises a rigid core having a slab of deformable material, such as urethane, bonded to the core face which slides and drives the driven tubular part. In a preferred form, the spline barrel is formed in two pieces. The spline-receiving grooves are formed at the upper end of the lower barrel section. The threaded pin of the upper barrel section locks the splines in the grooves. Because the splines are spaced downwardly from the end of the barrel, the mandrel has an ungrooved, thick-walled upper section which provides desired strength. Seals are provided at the upper end of the barrel and on the spline mandrel to form an annular chamber, containing the splines, filled with lubricant. The spline assembly is characterized by improved wear qualities relative to prior art assemblies.

11 Claims, 16 Drawing Figures

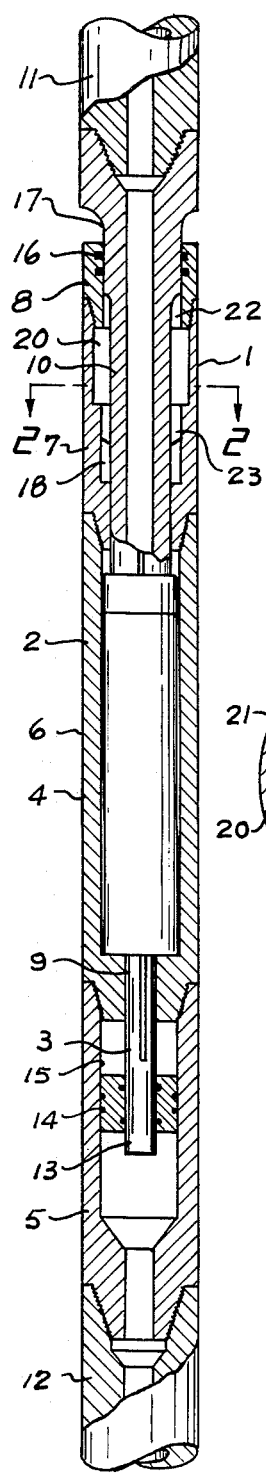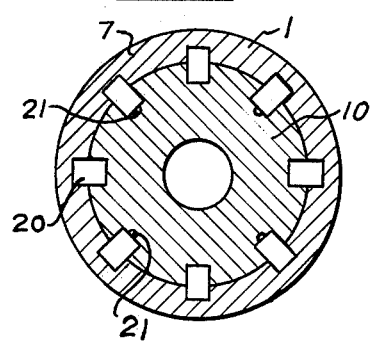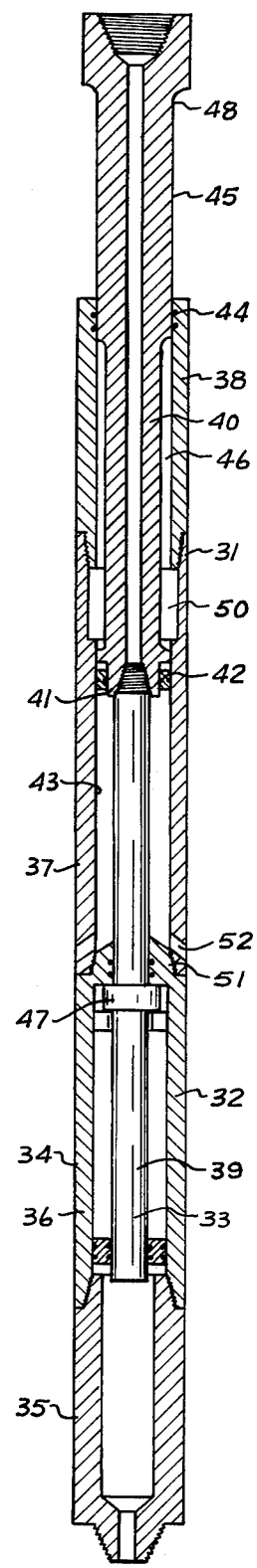

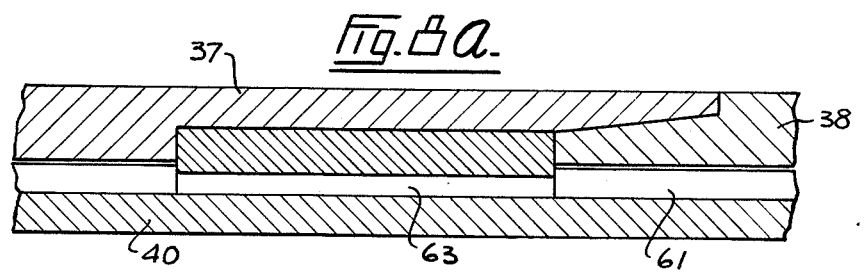
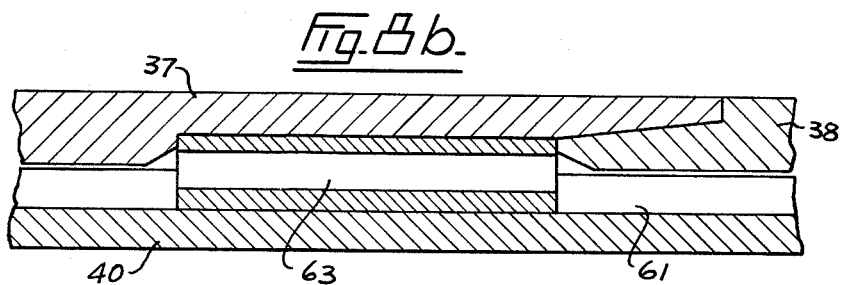
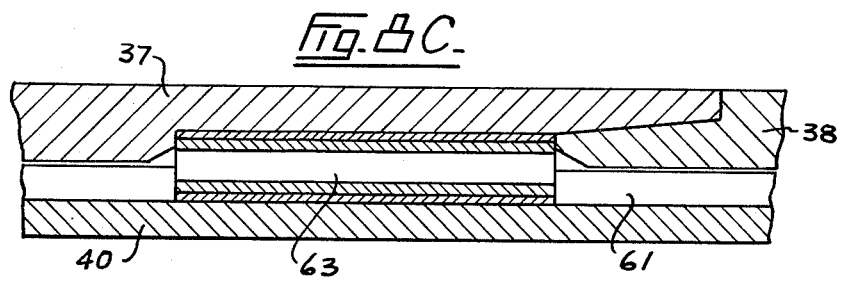
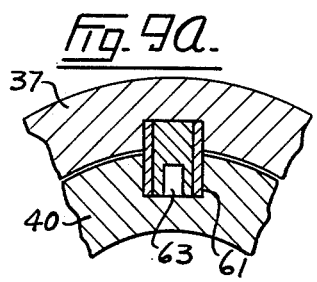
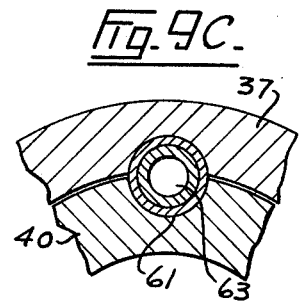
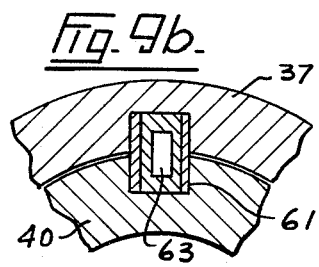

SPLINE MECHANISM FOR DRILL TOOLS

BACKGROUND OF THE INVENTION

This invention relates to a spline mechanism for use in relation with telescoping tools forming part of a drill string.

In drilling tools such as vibration dampers, jars, bumper subs and offshore drilling subs, it is usual to incorporate a spline mechanism to transmit rotary motion through the tool while permitting a telescoping motion of the tool's tubular parts to occur. That portion of the tool's outer tubular part which helps to form the spline mechanism will be referred to hereafter as the spline barrel while that portion of the inner tubular part which helps to form the spline mechanism will be referred to as the spline mandrel.

The prior art spline mechanisms of interest can be divided into two groups. In the first such group, circumferentially spaced and longitudinally extending ribs are provided along the internal and external surfaces of the spline barrel and mandrel respectively. These ribs intermesh when the tool is assembled to provide rotary interlocking of the spline barrel and spline mandrel. The parts are free to telescope relative to one another. In the second group, matching longitudinally extending grooves are formed in the said surfaces to define passages. Rods or ball bearings are inserted in the passages to provide the necessary rotary connection for the tool.

The spline mechanism can either be a sealed lubricated system, or one exposed to and working in the abrasive drilling mud which fills the well bore. The present invention had to do with a spline mechanism having insertable splines, preferably having a sealed, lubricated environment in which the splines operate.

Spline mechanisms in oil tool service are characterized by certain problems when in use.

The most serious problem is that of extreme wear of the splines. More particularly, the constant telescoping movement of the conventional steel-on-steel splines while they are transmitting torque rapidly degrades their surfaces. Even when operating in an oil bath, the splines sustain extreme wear. We believe that the lubricant is swept away from the sliding steel surfaces as they are pressed together due to torque. This leaves the surfaces dry and allows galling and wear to occur. In addition, irregularities in the matchup of the steel faces leads to concentrations of stress, which further accelerate wear. If the spline mechanism is open to the drilling mud, wear is increased by the presence of abrasive solids which can get between the sliding spline surfaces.

Because of the extensive wear, it is necessary to replace a spline mandrel or barrel or both the mandrel or barrel on a periodic basis at considerable expense. In order to maximize the useful life of the spline mandrel and barrel, it is thus necessary to fabricate the spline mechanism parts to close tolerances. This naturally increases the manufacturing cost of the tool. The maintenance cost associated with replacing worn out splines, mandrels, and barrels is bound to be a significant portion of the maintenance cost of the tools. It is further found that excessive wear of the splines (which occurs particularly in the spline system exposed to the well environment) leads to serious operating problems with the tool, whereby the tool can become jammed in an open position thus becoming inoperative. In some instances, the substantial amount of backlash which arises in the spline system after excessive wear has occurred will give rise to backing off of the threaded joints and consequent serious tool damage.

Another problem experienced in prior art spline systems occurs when the splines are exposed to the well fluids. More particularly, the annular area below the splines tends to become packed with shale and solid particles from the drilling operation. As this space packs in with solids, the tool becomes difficult or impossible to close.

Another problem common to many prior art oil tool spline mechanisms has to do with their relative weakness and instability when in the extended position. For example, a typical structural arrangement involves providing the female spline in the upper segment of the spline barrel. When the spline mandrel of this arrangement is withdrawn from the barrel to the extended position, the mandrel is likely to wobble when rotating, thereby stressing its threaded connection with the main tool mandrel. Parting of the tool at this point is a frequent and troublesome occurrence.

Another problem experienced in known oil tool spline mechanisms, which are operating internal of a tool in a lubricated environment, is that the enclosed splines tend to give off metallic particles or chips as wear progresses. These particles become dispersed throughout the tool and cause damage to the seals and close fitting parts.

SUMMARY OF THE INVENTION

With the foregoing background in mind, it is one object of this invention to provide a spline mechanism having insertable splines and characterized by improved performance.

It is another object to provide a spline mechanism whose splines have a capability for cushioning torsional vibrations.

It is a preferred object to provide a spline mechanism having insertable splines disposed in a sealed, lubricated chamber, which may be internal or external the main working section of the tool.

It is another preferred object to provide a spline mechanism whose splines have an improved lubrication distribution system.

It is a preferred object to provide a spline mechanism which can be inexpensively and easily repaired.

It is another preferred object to provide a spline mechanism comprising a spline mandrel stabilized within the spline barrel and having a thick wall section extending from the spline barrel when the tool is opened, thereby reducing the risk of parting.

It is another preferred object to provide a spline system which can be attached to a conventional jar type tool and which has improved resistance to packing in the annular space.

In accordance with the invention, a novel spline mechanism for telescoping drill tools is provided. The spline mandrel and barrel are formed with longitudinally extending grooves in their outer and inner surfaces respectively. The grooves cooperate to form spline-receiving passages. An elongate, composite spline is inserted in at least one, but preferably all of the passages, to interconnect the mandrel and barrel for rotation together while permitting longitudinal movement. Each spline comprises a rigid core (usually steel) having a slab or coating of deformable, resilient, abrasion-resistant material (preferably urethane) at the core face which slides and drives the driven tubular part. Despite the torque, friction and heat to which the composite splines are subjected, it has been found that they stand up and wear significantly better than conventional steel splines. It has also been found that the spline-receiving passages do not wear significantly, therefore, when the splines do wear, they can easily and inexpensively be replaced.

In a preferred embodiment, a spline mechanism is provided as follows:

1. A two-piece spline barrel is formed comprising a spline section and a cap section connected together end-to-end;
2. The spline section has spline-receiving, longitudinally extending, circumferentially spaced grooves at its upper end;
3. The spline mandrel extends through the cap section into the spline section and has external, longitudinally extending, circumferentially spaced grooves formed on that portion of the spline mandrel internal of the spline barrel when the tool is in the extended position;
4. Splines, preferably composite splines, are disposed in the passages formed by matching spline mandrel and spline barrel grooves to key the parts together;
5. The threaded pin of the cap section retains the splines in place;
6. The spline mandrel, or an extension thereof, preferably carries sealing means at its inserted end, which coact with the spline barrel's internal surface or an extension thereof to provide a liquid-tight seal. The cap section also preferably carries sealing means which coact with the external surface of the spline mandrel to provide a second liquid-tight seal. Thus the splines are disposed in a sealed chamber, which is normally filled with a lubricant such as a light oil;
7. Since the splines are spaced downwardly from the upper end of the spline barrel, it has been possible to form the spline barrel with a thick-walled upper segment;
8. In addition, the spline mandrel is stabilized at its lower end by the lower sealing means and at its upper end by the barrel cap section sealing means.

Particularly when used internally in a fluid-filled drill tool, the invention is characterized by several advantages. Firstly, the wearing quality of the composite spline-equipped mechanism is superior to steel-on-steel mechanisms. This appears to be attributable to: the combination of the even surface contact of the deformable spline slabs with the walls of the grooves, the cushioning of torque vibrations, and the abrasion resistance and anit-friction qualities of the lubricated slab; the protection of the splines by the sealed oil bath; and the reduction in spline and mandrel instability and inflexibility. Secondly, the removable splines can be easily changed out and new splines inserted into the original tubular parts. Since the original tubular parts are found to sustain negligible wear on their spline-receiving grooves, the maintenance cost for the tool are substantially reduced. Thirdly, the manufacturing tolerances for the tool can be relaxed, as the wear and vibration problems have been alleviated and the deformable splines are not as sensitive to dimensional tolerances as are steel-on-steel splines. Fourthly, the internal operating fluid in the tool is maintained in a clean condition, uncontaminated by metallic chips or other wear products. Overall tool life is therefore significantly extended. Finally, a particular tool can be modified for different hole conditions simply by changing the nature of the inserted splines.

When used in a separate spline sub, the invention is also characterized by several advantages in addition to the ones listed above. Firstly, due to the nature of the spline mandrel and barrel the tool can be designed with a large integral mandrel and tool joint so that the tool is substantially stiffer than was formerly the case. This is believed to reduce hole deviation during drilling. Secondly, improved stabilization of the spline mandrel by the seals protects the joint between the spline mandrel and the seals protects the joint between the spline mandrel and the main mandrel. Also, since the splines do not wear, backlash is reduced and consequently backing off of the joint between the spline mandrel and the main mandrel is minimized. Lastly, due to the positive sealing system at the inserted end of the spline mandrel, positive ejection of the well mud through the tool ports prevents packing of shale and other solids in the annular chamber. This allows the tool to operate continuously without packing up due to solids accumulation in the annular area.

Broadly stated, the invention is a spline mechanism for a telescoping tool useful in a drill string and comprises: a tubular outer part; a tubular inner part arranged to slide longitudinally within the outer part; one of said parts being adapted to connect to the upper driving portion of a drill string and the other part being adapted to connect with the lower driven portion of the drill string; said parts cooperating to form insertable spline-receiving passages; and a composite insertable spline disposed in at least one passage for interconnecting the tubular parts so that they rotate together in use and may slide longitudinally relative to each other; each said insertable spline comprising a substantially rigid body having a driving face that slides relative to the driven tubular part, said face having a slab of deformable, resilient, abrasion-resistant material associated therewith.

DESCRIPTION OF THE DRAWINGS

FIG. 1 is a drawing of a drill string vibration damper tool with the preferred spline mechanism incorporated therein and shown in the partially compressed position—many of the parts of the damper are omitted from this drawing for purposes of simplification—the details of the damper are disclosed in our co-pending Canadian application Ser. No. 204,532, filed July 10, 1974;

FIG. 2 is a section view taken along the line 2—2 of FIG. 1;

FIG. 3 is a drawing of a prior art jar tool with our preferred spline mechanism incorporated therein and shown in the extended position—the jar tool is shown in detail in Canadian Pat. No. 931136 issued July 31, 1973 to Leonard Mason;

FIGS. 8a–8c are sectional longitudinal views of splines in association with portions of the tubular parts, illustrating different embodiments of the oil bypass passage placement; and FIGS. 9a–9c are transverse sectional views of the embodiments shown in FIGS. 8a–8c.

DESCRIPTION OF THE PREFERRED EMBODIMENT

Figure 4:
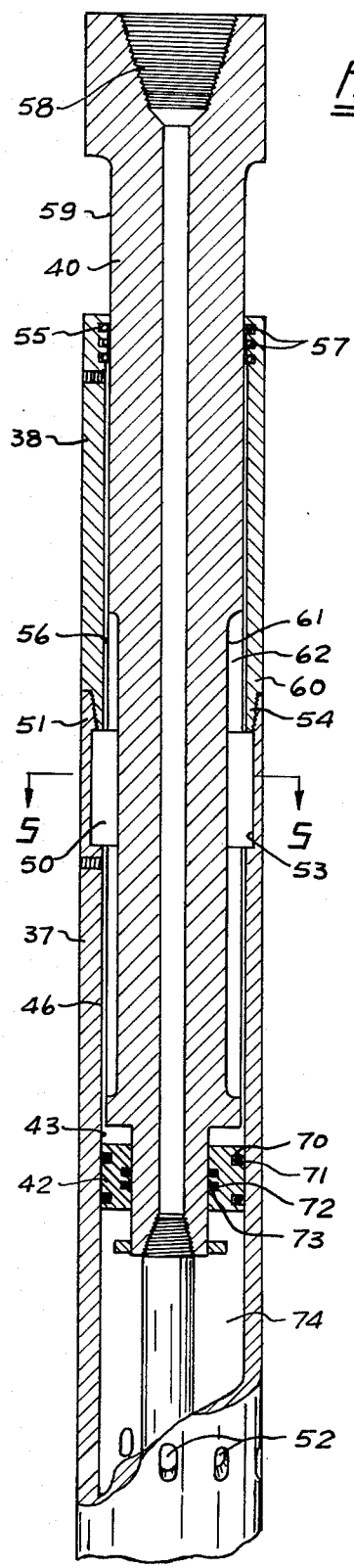
FIG. 4 is a detailed longitudinal section view of the preferred spline mechanism shown in FIG. 3.

With reference to FIGS. 1 and 2, the spline mechanism 1 is shown incorporated as part of a drill string vibration damper tool 2. The tool 2 comprises inner and outer telescoping members 3, 4, commonly referred to as the mandrel and barrel. The barrel 4 comprises a bottom sub 5, a main barrel 6, a spline barrel 7, and a cap section 8. The mandrel 3 comprises a main mandrel 9 and a spline mandrel 10. The mandrel sections and barrel sections are joined together by threaded pin and box connections. Attached to the mandrel by a threaded connection is the upper portion of the drill string 11 and attached to the barrel by a threaded connection is the lower portion of the drill string 12 (commonly the drill bit).

The spline mandrel 10 provides the inner tubular part of the spline mechanism 1 while the outer tubular part of the spline mechanism 1 is provided by the spline barrel 7 and cap section 8. Composite splines 20 key the grooved spline mandrel 10 and spline barrel 7 together so that they rotate as a unit but can slide longitudinally relative to each other. A longitudinally ungrooved portion 13 at the bottom of the mandrel 3 carries a seal element 14 (shown as a floating seal) which coacts with the internal surface 15 of the barrel 2 to provide a liquid-tight seal. Another seal element 16 (shown as a fixed seal) is mounted internal of the seal cap 8 and coacts with the external surface 17 of the spline mandrel 10 to also provide a liquid-tight seal. The annular space 18, formed by the mandrel 3 and barrel 2 and seal elements 14 and 16, is filled with lubricating fluid, such as a light oil. As shown in FIG. 2, oil bypass passages 21 are provided in the spline mandrel 10 to allow the lubricating oil to pass between the annular chamber 22 above the splines 20 and the annular chamber 23 below the splines.

With reference to FIG. 3, the spline mechanism 31 is shown incorporated as part of a jar tool 32. The jar tool 32 comprises inner and outer telescoping members 33, 34, commonly referred to as a mandrel and barrel. The barrel 34 comprises a bottom sub 35, a jar barrel 36, a spline barrel 37 and a cap section 38. These sections are joined end-to-end by threaded pin and box connections. The spline barrel 37 and cap section 38 together make up the outer tubular part of the spline mechanism. The mandrel 33 comprises a main or jar mandrel 39 and a spline mandrel 40. These parts are joined end-to-end by a threaded pin and box connection. The spline mandrel 40 provides the inner tubular part of the spline mechanism. Composite splines 50 key the grooved spline mandrel 40 and grooved spline barrel 37 together so that they rotate as a unit but can slide longitudinally relative to each other. A longitudinally ungrooved portion 41 at the base of the spline mandrel 40 carries a seal element 42 (shown as a floating seal) which coacts with the internal surface 43 of the spline barrel 37 to provide a liquid-tight seal; another seal element 44 is mounted internally of the upper end of the cap section 38 and coacts with the external surface 45 of the spline mandrel 40 to also provide a liquid-tight seal. The annular space 46, formed by the surfaces 43, 45 and the seal elements 42, 44, is filled with lubricating oil. An enlargement 47 on the mandrel 33 and the box end 48 at the upper end of the spline mandrel 40 limit the extent of axial movement of the telescoping members 33, 34.

Figure 5:
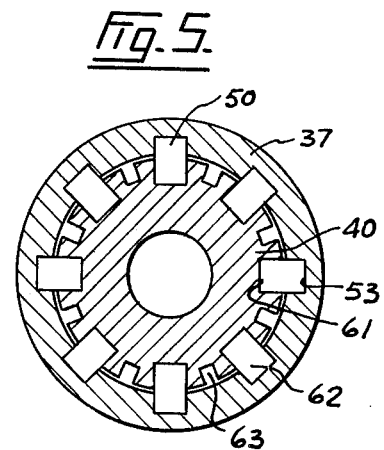
FIG. 5 is a section view taken along the line 5—5 of FIG. 4.
Figure 6:
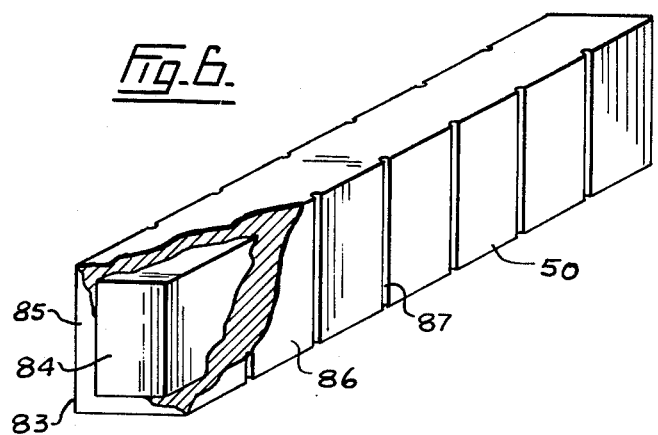
FIG. 6 is a perspective, partly-broken-away view of one embodiment of the spline.

With reference now to FIGS. 4 and 5, the spline barrel 37 is a tubular steel body having threaded boxes 51 at each end. Ports 52 are bored through the spline barrel wall at its lower end to allow drilling fluid to enter and leave the annular space 73. The size and number of these ports 52 is generally chosen to allow movement of the drilling fluid without restricting the telescoping action of the tool.

A series of circumferentially spaced, longitudinally extending, internal grooves 53 are formed in the wall of the spline barrel 37. These grooves 53 extend downwardly from the upper box 51. The interior surface 43 of the spline barrel 37 is smoothly finished to provide a good sealing surface.

The cap section 38 is also a tubular steel body having a threaded pin 54 at its lower end. The pin 54 screws into the spline barrel box 51 to connect the members 37, 38 end-to-end. Circumferential grooves 55 are cut in the internal surface 56 of the cap section 38 at its upper end and O-ring seals 57 are mounted therein. It is to be noted that the diameter of the longitudinal bore 56 extending through the cap section 38 is substantially constant.

Turning now to the spline mandrel 40, it is a tubular steel member having a threaded box 58 at its upper end, an upper section 59, a grooved section 60 and a longitudinally ungrooved portion 41 at its base. The section 60 has a plurality of circumferentially spaced, longitudinal, external spline grooves 61 extending upwardly from the seal portion 41 to the section 59. These spline grooves 61 match up with the grooves 53 in the spline barrel to form passages 62. A second set of circumferentially spaced, longitudinally extending bypass grooves 63 are formed by section 60 to permit oil to move easily from one end of the annular space 46 to the other as the spline mandrel 40 moves in and out of the spline barrel 37. Alternative embodiments of the bypass grooves are shown in FIGS. 8 and 9. The portion 41 carries a floating seal element 42 provided with external grooves 70 in which are mounted O-ring seals 71 and internal grooves 72 in which are mounted O-ring seals 73.

Composite splines 50 are disposed in the passages 62. It will be noted that the pin 54 of the cap section 38 locks the splines 50 into the grooves 53 of the spline barrel 37. Thus the splines are stationary. They can easily be changed out by unscrewing the cap section 38 and sliding it up the spline mandrel 40. The mandrel 40 is then pulled from the barrel 37 to release the splines 50. As shown, the splines 50 extend into the grooves 61 of the spline mandrel 40 and key it to the spline barrel 37.

Figure 7A:
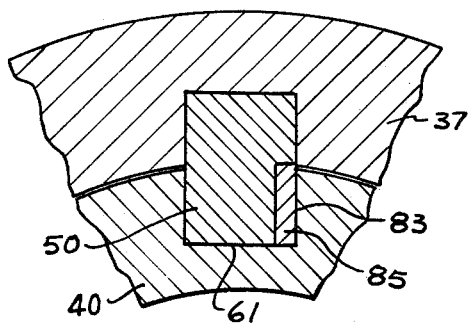
FIGS. 7a–7d are sectional transverse views of splines in association with portions of the tubular parts, illustrating different embodiments of slab placement.
Figure 7B:
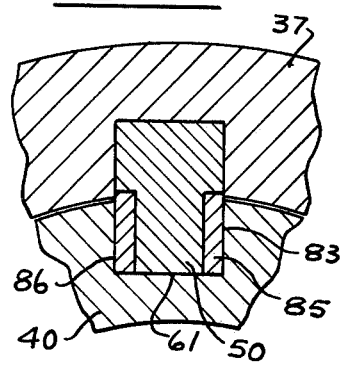
Figure 7C:
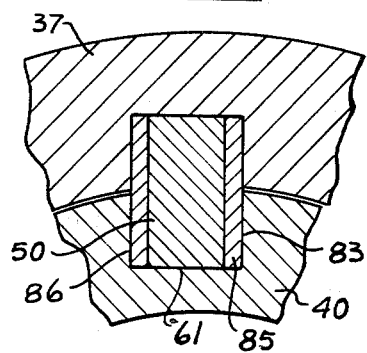
Figure 7D:
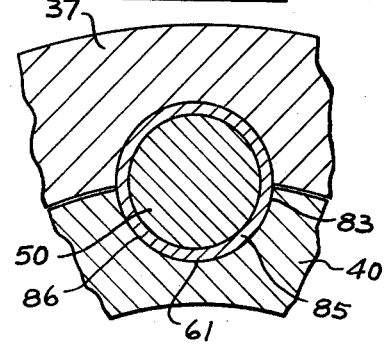

Since the splines 50 are locked in place in the spline barrel 37, severe wear only occurs at the spline face 83, which is subjected to both friction and torque effects. This face 83 of each spline core 84 is at least partly covered by a slab 85 or coating of deformable, resilient, abrasion-resistant material, preferably bonded thereto. It is also useful to provide a similar slab on the backlash face 86 of the spline core, as it also slides within the spline mandrel grooves 61 and is subject to some wear. Alternative embodiments are shown in FIGS. 7c and 7d.

The slab 85 is preferably formed of urethane having a Shore D durometer hardness within the range 50–70.

In a preferred form, the slab 85 is formed with transverse oiler grooves 87 which ensure that lubrication of the faces 83, 86 is maintained.

It will be readily understood that minor changes in the size, form and construction of the various parts of the splines and spline assembly may be made and substituted for those herein shown and described, without departing from the spirit of the invention, the scope of which is set forth in the appended claims.

The embodiments of the invention in which an exclusive property or privilege is claimed are defined as follows:

1. A spline mechanism for a telescoping tool useful in a drill string which comprises:
   a tubular outer part;
   a tubular inner part arranged to slide longitudinally within the outer part;
   one of said parts being adapted to connect to the upper driving portion of a drill string and the other part being adapted to connect with the lower driven portion of the drill string;
   said parts co-operating to form insertable spline-receiving passages;
   and a composite insertable spline disposed in at least one passage for interconnecting the tubular parts so that they rotate together in use and may slide longitudinally relative to each other;
   each said insertable spline comprising a substantially rigid body having a driving face that slides relative to the driven tubular part, said face having a slab or coating of deformable, resilient, abrasion-resistant material associated therewith.

2. The spline mechanism as set forth in claim 1 comprising:
   seal means extending between the tubular parts above and below the longitudinal grooves to provide liquid-tight seals; and
   a lubricating fluid contained in the annular chamber formed between the tubular parts and limited by the seal means.

3. The spline mechanism as set forth in claim 2 wherein:
   the spline body is formed of steel and the slab comprises urethane, said urethane being bonded to the steel body.

4. The spline mechanism as set forth in claim 3 wherein:
   the urethane has a Shore D durometer hardness within the range 50 to 70.

5. In a telescoping tool, having a main mandrel and barrel, useful in a drill string, a spline mechanism which comprises:
   a tubular outer part comprising a lower spline barrel and an upper cap member;
   said spline barrel having an upper threaded box end and a lower threaded connection, a plurality of circumferentially spaced, longitudinal, internal grooves extending downwardly from the upper box end, said spline barrel being connected at its lower end to the main barrel to form an outer member;
   said cap member having a threaded pin at its lower end engaging the upper box end of the spline barrel;
   a tubular inner part telescopically received in the outer part and having means at its lower end for connection with the main mandrel of the tool to form an inner member;
   1 said inner and outer members carrying liquid-tight seal elements above and below the grooves, said seal elements combining with the outer and inner surfaces of said members to form a sealed annular space;
   said inner part having a plurality of circumferentially spaced, longitudinal, external grooves for cooperating with opposed outer part grooves to form insertable spline-receiving passages;
   an insertable spline disposed in at least one passage for interconnecting the inner and outer parts so that they will rotate together and may slide longitudinally relative to each other, the cap member pin being operative to retain the splines in the spline barrel;
   said inner and outer parts having means at their ends for connecting them to a drill string; and
   lubricating fluid disposed in said sealed annular space for lubricating said splines.

6. The spline mechanism as set forth in claim 5 wherein:
   the cap member fixedly carries one seal element adjacent its upper end; and
   said inner part carries a floating seal element at its lower end;
   said cap member seal element cooperating with the external surface of the inner part to provide a liquid-tight seal, said inner part seal element cooperating with the internal surface of the outer member below the grooves to provide a liquid-tight seal.

7. The spline mechanism as set forth in claim 6 wherein:
   each spline comprises a substantially rigid body having a face that slides relative to one of the tubular parts, said face having a slab of deformable, resilient, abrasion-resistant material associated therewith.

8. The spline mechanism as set forth in claim 7 wherein:
   at least one of the tubular parts or the splines define grooves for permitting lubricating fluid to flow from below the splines to above them and vice versa.

9. The spline mechanism as set forth in claim 8 wherein:
   said inner part has an ungrooved portion at its lower end which carries the seal means and cooperates with the spline barrel to stabilize said inner part.

10. The spline mechanism as set forth in claim 7 wherein:
    each spline comprises a steel body having a slab comprising urethane bonded thereto.

11. The spline mechanism as set forth in claim 5 wherein:
    each spline comprises a substantially rigid body having a face that slides relative to one of the tubular parts, said face having a slab of deformable, resilient, abrasion-resistant material associated therewith.

* * * * *